Oct. 30, 1928.                            1,689,550
A. DICK ET AL
AGRICULTURAL MACHINE
Filed Oct. 16, 1926
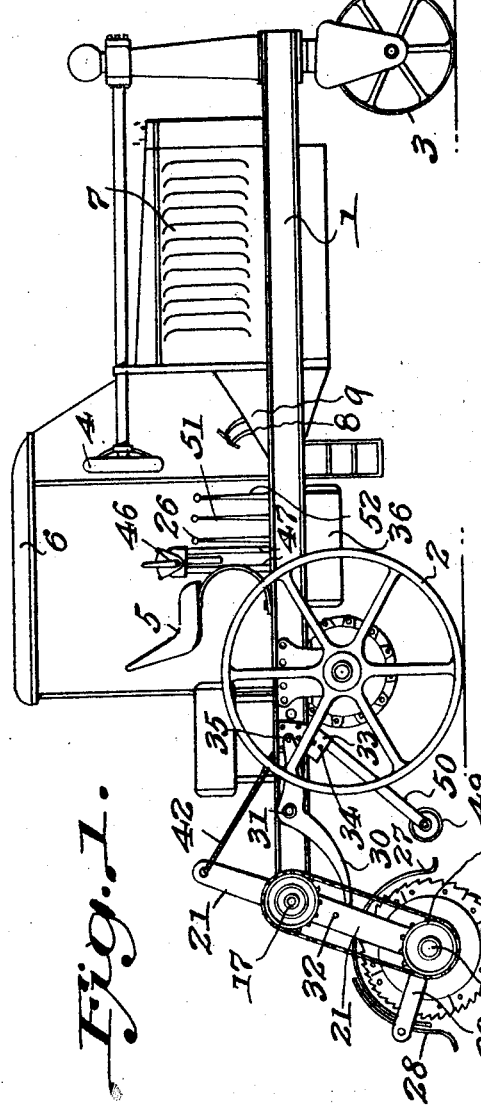
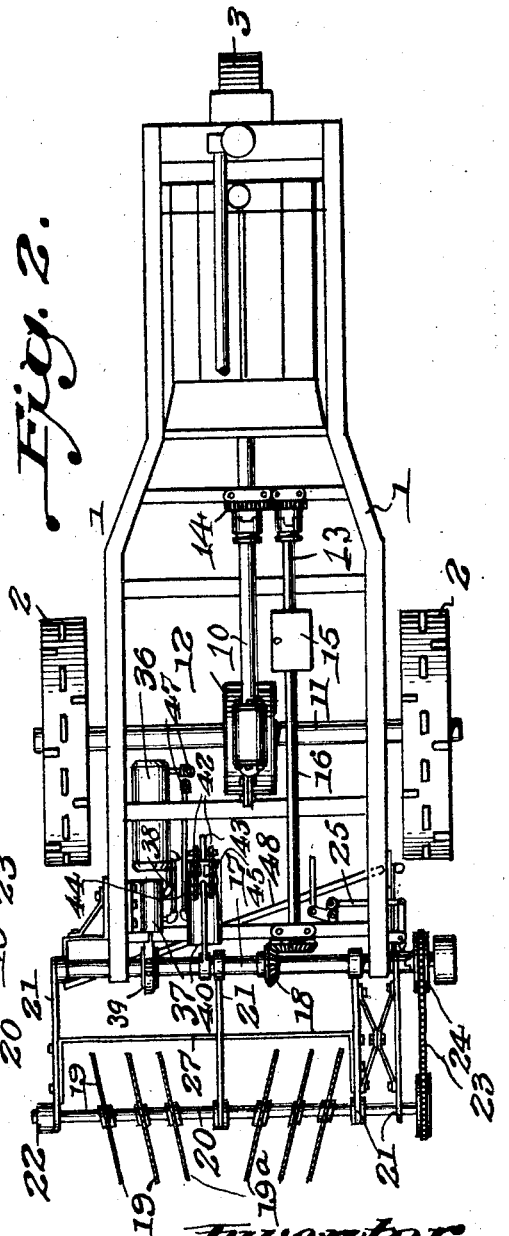
Inventor,
Arthur Dick
and
Jacob A. Deischauer
By [signature] Atty.

Patented Oct. 30, 1928.

1,689,550

UNITED STATES PATENT OFFICE.

ARTHUR DICK AND JACOB A. DIRSCHAUER, OF EVANSVILLE, INDIANA.

AGRICULTURAL MACHINE.

Application filed October 16, 1926. Serial No. 142,046.

The present invention relates to a wheeled agricultural machine intended for use in pulverizing and cultivating soil, rolling down and destroying weeds and other dangerous growths, and to serve the purpose of a plow, harrow, and drag.

Our purpose is to improve the machine set forth in our application Serial No. 112,906 filed June 1, 1926.

To that end, we have provided in the present machine a novel housing for the soil-treating disks which serves the purpose of protecting the disks and also preventing the soil and growths treated by the disks from being thrown about and insuring that the treated soil be retained within proper area.

Other inprovements comprise a leveling bar which bends or depresses or throws down the weeds and other growths which are to be rolled down and cut up, and a roller.

Our present improvements are illustrated and described in connection with a machine that is propelled and operated by its own power.

In the accompanying drawings:

Figure 1, is a side elevation; and

Fig. 2, is a plan view, certain parts being omitted.

The frame of the machine appears at 1, the drive wheels being shown at 2 and the steering wheels at 3. The wheels 3 are steered by any suitable hand wheel 4 arranged convenient to the driver's seat 5.

A suitable canopy or cab 6 may be provided.

The machine has an internal combustion engine 7 which is controlled in the usual manner; the brake and clutch pedals appear at 8 and 9. The propeller shaft appears at 10 and is used to drive the shaft 11 for the wheels 2 through any suitable gearing 12.

Power is taken from the propeller shaft 10 for use in operating the disks and other means requiring power through a countershaft 13 which is geared at 14 to shaft 10. Any suitable gear-set 15 may be used to change the speed of the shaft 16 as may be desired.

The shaft 17 which is suitably journaled in the frame 1, is driven from the shaft 16 by bevel gears 18.

The serrated toothed disks 19 which are used to treat the soil, are carried by a shaft 20 which is suitably journaled in a frame 21 which is rockably mounted at 22.

The shaft 20 is driven from shaft 17 by a chain and sprocket drive 23.

A clutch 24 enables the chain sprocket drive 23 to be coupled to the shaft 17 or uncoupled therefrom. The clutch 24 is operated by the connections 25 to lever 26 and arranged convenient to the driver's seat 5.

The serrated disks 19 are of the same construction as set forth in our earlier application. They may be arranged as shown in said application or in two gangs as in Fig. 2 where the disks of each gang are parallel and yet the disks of the respective gangs converge toward each other and the adjacent disks 19ª of the two gangs constitute a pair of converging disks.

The soil is treated in the manner set forth in our earlier application.

The gangs of disks 19, 19ª are covered by housing 27 which is secured to the arms 21 and covers the upper half of each disk. This housing serves to prevent the soil and cut-up weeds and other growths from being thrown about and causes them to fall to the ground right after they are operated on by the disks 19, 19ª. At the same time, the housing 27 prevents injury to any one with whom the disks might otherwise come in contact.

There is a supplemental shield or housing 28 which is carried by arms 29 which may be adjusted or set so that the shield 28 may be raised or lowered in relation to housing 27 according to the position of the disks and the depth they penetrate the soil. The gangs of disks are adapted to be swung by moving the arms 21. They may be retained in any position to which they are adjusted by means of a lever 30 pivoted at 31 to the frame 1 and connected at 32 to one of the arms 21. Secured to the frame 1 is a plate 33 having a row of holes 34. A pin 35 carried by the lever 30 may be inserted in any one of the holes 34, thus locking the disks where set.

In Fig. 2 the housing 27 and the supplemental housing 28 are omitted, in order that other parts may more fully appear.

To relieve the operator of manually raising and lowering the disks, we provide an air control therefor. A tank or reservoir 36 receives air pressure from an air pump 37 through pipes 38. The air pump is operated from shaft 17 by an eccentric 39. The shaft 17 carries an arm 40 which has a cross-head 41 connected by two cables 42 to the piston rod 43 which is operated by a piston cylinder 44. The cables 42 pass over the idlers 45. The cylinder 44 is under the control of a three-way valve 46 which is located conveniently for operation by the driver. Pipes 47 connect the reservoir 36 and the cylinder 44 to the valve casing of the valve 46.

When the pressure in the reservoir 36 is insufficient, the clutch 24 is disconnected and the shaft 17 is driven from the engine for a sufficient length of time to enable the air pump 37 to build up suitable pressure in the reservoir. This can be done when the machine is standing, but the rotation of the shaft 17 when the machine is moving, operates the air pump.

When it is desired to adjust the gangs of disks, the operator operates the valve 46 to let off the air from the cylinder 44 or to admit it to said cylinder, according to the adjustment desired.

Extending across the machine is a deflector or leveler 48 comprising a bar which is arranged diagonally in a cross-wise direction in relation to the frame. This bar turns weeds and other growths downwardly so that they will be pressed into the soil by a roller 49 located in front of the disks and carried by a frame piece 50.

As the machine advances the leveler 48 presses down the weeds and growths which are then leveled by the roller 49. The disks follow after the roller 49 and pulverize the soil, cut up the weeds and growths and bring about an action which is equivalent to plowing, harrowing, and dragging.

The gear set 15 enables any desired speed or rate of rotation to be imparted to the disks.

The levers 51, 52 are conveniently arranged for operation by the driver for shifting the controls.

What we claim is:

In a wheeled agricultural machine, the combination with the machine frame, of arms movably suspended from said frame and adapted to be secured where positioned, a gang of soil-treating disks carried by said arms, other arms which are adjustably mounted on the first-named arms and adapted to be set in different raised or lowered positions, a main shield or housing which is secured to the first-named arms and covers the upper parts of the disks, and a supplemental shield or housing which is carried by the last-named arms and is adapted to slide in relation to the first-named housing when the last-named arms are adjusted, said supplemental shield or housing enabling the effective coverage of the disks to be increased, more or less, by adjusting the arms which carry said supplemental housing.

In testimony whereof we affix our signatures.

ARTHUR DICK.
JACOB A. DIRSCHAUER.